United States Patent [19]
Oyama et al.

[11] Patent Number: 5,638,416
[45] Date of Patent: Jun. 10, 1997

[54] FUEL ASSEMBLY

[75] Inventors: Junichi Oyama; Akihiro Kato, both of Naka-gun; Masaji Mori, Kobe; Toshiyuki Kawagoe, Yokohama; Kazuichi Suzuki, Kobe; Hitoshi Inada, Naka-gun; Hiromasa Miyai, Kobe, all of Japan

[73] Assignees: Mitsubishi Nuclear Fuel Co.; Mitsubishi Jukogyo Kabushiki Kaisha, both of Tokyo, Japan

[21] Appl. No.: 353,388

[22] Filed: Dec. 2, 1994

[30] Foreign Application Priority Data

Dec. 3, 1993 [JP] Japan ................... 5-304462

[51] Int. Cl.$^6$ ............................................. G21C 3/34
[52] U.S. Cl. ........................ 376/442; 376/439; 376/462; 376/438
[58] Field of Search ...................... 376/442, 439, 376/462, 438; 976/DIG. 80, DIG. 81, DIG. 74, DIG. 79

[56] References Cited

U.S. PATENT DOCUMENTS

| | | |
|---|---|---|
| Re. 28,079 | 7/1974 | Andrews et al. .............. 376/442 |
| Re. 30,247 | 4/1980 | Andrews et al. .............. 376/442 |
| 3,679,547 | 7/1972 | Warberg ...................... 376/442 |
| 3,920,515 | 11/1975 | Ferrari et al. ............... 376/442 |
| 4,521,374 | 6/1985 | Duncan ....................... 376/462 |
| 4,885,127 | 12/1989 | Yokoyama et al. . |
| 4,895,698 | 1/1990 | DeMario ...................... 376/442 |
| 4,923,669 | 5/1990 | DeMario ...................... 376/442 |
| 5,139,736 | 8/1992 | Bryan ......................... 376/442 |

FOREIGN PATENT DOCUMENTS 2352373  12/1977  France .

*Primary Examiner*—Charles T. Jordan
*Assistant Examiner*—Meena Chelliah
*Attorney, Agent, or Firm*—Oblon, Spivak, McClelland, Maier & Neustadt, P.C.

[57] ABSTRACT

An arrangement of fuel rod support members having dimples and springs is presented to prevent abrasive wear of the fuel rods caused by bouncing of the fuel rods against the supporting members caused by vibrations in a diagonal direction of the support grids. The supporting members are disposed such that dimples are respectively provided on one pair of adjacent walls located on one side of the vibrational direction while springs are respectively provided on adjacent walls located on the opposite side of the vibrational direction.

2 Claims, 3 Drawing Sheets

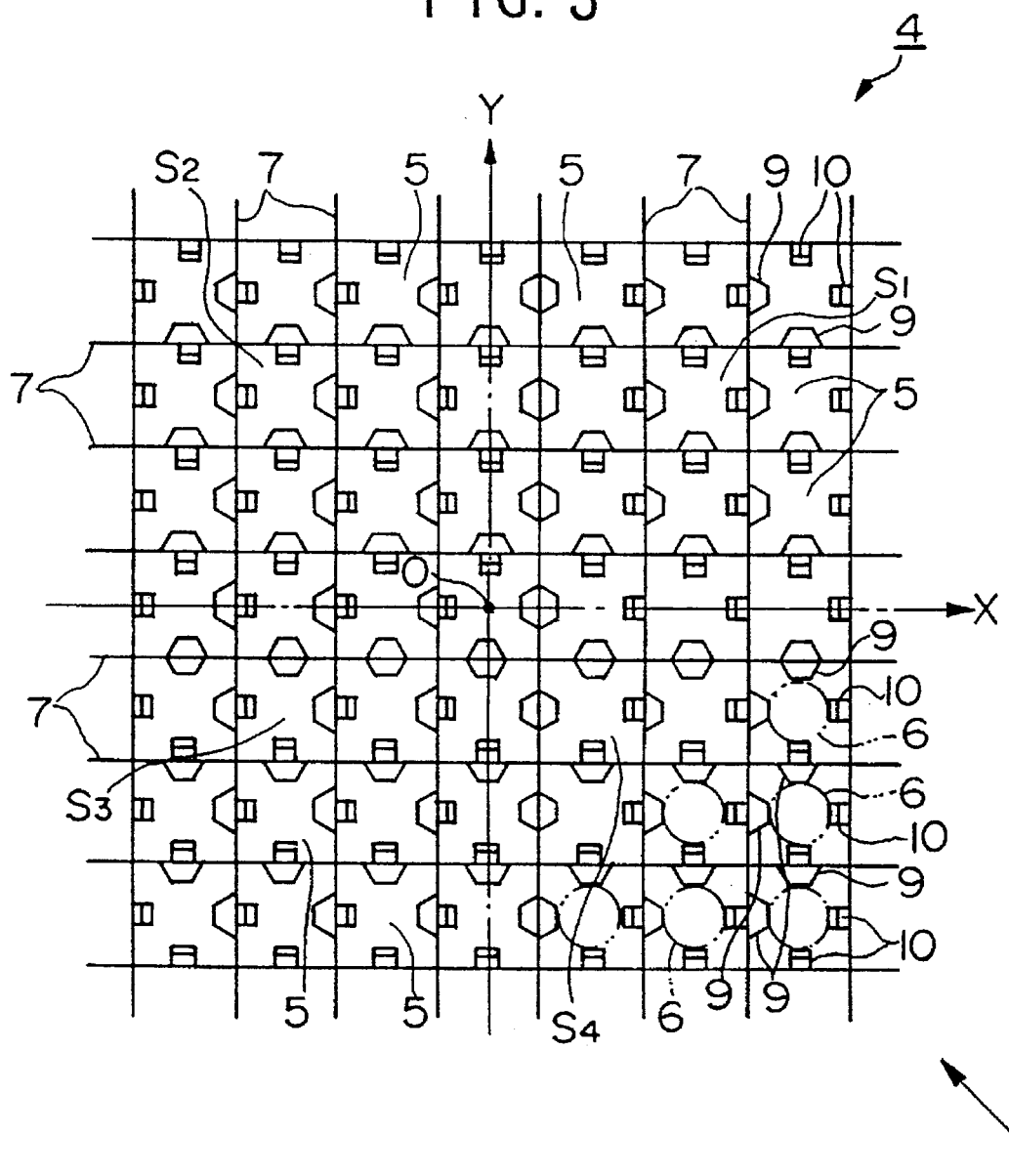

FUEL ASSEMBLY

BACKGROUND OF THE INVENTION

1. Field of the Invention

The present invention relates in general to fuel assemblies for nuclear reactors, and relates in particular to a fuel assembly for preventing abrasion of fuel rods caused by vibrations in the fuel assembly.

Background of the Invention

A known example of a fuel assembly for a pressurized light water reactor is shown in FIG. 2.

The fuel assembly shown in this drawing is provided with an upper nozzle 1, and a lower nozzle 2 which is oppositely spaced apart from the upper nozzle 1. A plurality of control rod guide pipes 3 are fixedly disposed between the upper nozzle 1 and the lower nozzle 2, and a plurality of support grids 4 are attached to the control rod guide pipes 3 in the middle section of the fuel assembly with a certain spacing, and a plurality of fuel rods 6 are inserted through and supported by the support grids 4.

As shown in FIG. 3, each of the support grids 4 comprises a plurality of straps 7 crossing at right angles to each other to produce a grid network and a plurality of square-shaped grid cells 5 therein. A plurality of dimples 9 and springs 10 are provided on the opposing walls surrounding each of the grid cells 5 to elastically hold the fuel rods 6 which are inserted through the grid cells 5.

The dimples 9 and the springs 10 are disposed in the grid cells 5 in the pattern shown in FIG. 3. Dividing the support gird 4 in a plan view into four quadrants S1, S2, S3 and S4 in a counter-clockwise designation about an origin O, equivalent to the center of the support grid 4. In the first quadrant S1, of the four walls defining each square-shaped grid cell 5, the dimples 9 are formed on the left and bottom walls while the springs 10 are formed on the right and top walls. In the second quadrant S2, the dimples 9 and the springs 10 are formed symmetrically to those in the first quadrant S1 with respect to the Y-axis. In the third quadrant S3, the dimples 9 and the springs 10 are formed symmetrically to those in the first quadrant S1 with respect to the origin O. In the fourth quadrant S4, the dimples 9 and the springs 10 are formed symmetrically to those in the first quadrant S1 with respect to the X-axis.

The fuel assembly comprising such support grids 4 is provided with a plurality of mixing vanes 15 formed at the intersections of the straps 7 (in the Figure, only a part of mixing vanes 15 are illustrated), for the purpose of stirring the cooling water for removing the heat generated by the fuel rods efficiently.

It is thought that, in a plan view of the grid, the turbulent flows caused by the presence of these mixing vanes are responsible for generating systematic vibrations of the fuel assembly in the diagonal direction shown by an arrow in FIG. 3.

When the fuel assembly vibrates in the diagonal direction, the following problem arises.

Specifically, considering the fuel rods 6 being held in the grid cells 5 which lie in the second and fourth quadrants, S2, S4, it can be seen that the fuel rods 6 are being supported by the dimples 9 in one direction of vibration, and by the springs 10 on the return direction of vibration. Because the dimples 9 have a higher resistance to deformation than that of the springs 10, there is a difference in the support being provided to the fuel rods 6 in the forward and reverse cycles of vibrations.

When the resistance to deformation of the supporting members differs in the forward and reverse cycles of vibration, if vibrations should be generated in the fuel assembly, the support grids 4 also vibrates, and the fuel rods 6 being held in the grid cells 5 disposed in the second and the fourth quadrants will exhibit a phenomenon of bouncing between the pairs of dimples 9 and the opposing springs 10. The fuel rods 6 under such a condition will experience abrasion caused by the fuel rods 6 rubbing against the dimples 9 and the springs 10.

SUMMARY OF THE INVENTION

The objective of the present invention is to resolve such wear problems related to vibrations in the conventional design of fuel assembly.

This objective is achieved in a fuel assembly comprising: fuel rods being elastically held by dimples and springs provided on four walls of square-shaped grid cells formed by a plurality of straps intersecting at right angles to each other in each of support grids, and in a plan view of said support grid, said four walls consisting of a first pair of adjacent walls located on one side of a diagonal vibrational direction and a second pair of adjacent walls located on an opposite side of said diagonal vibrational direction, wherein, throughout said support grid, said dimples are provided on said first pair of adjacent walls and said springs are provided on said second pair of adjacent walls.

According to the arrangement of the dimples and springs presented, the resistance to deformation support on both forward and reverse cycles of vibration become equal by placing a pair of supporting members consisting of a dimple and a spring in the forward direction of vibration while also providing a of dimple and spring pair in the reverse direction of vibration to balance the two directions of vibration. By this arrangement, the fuel rods are less likely to bounce between the supporting members, thus preventing abrasion wear caused by vibration in the diagonal direction of the fuel assembly.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

BRIEF DESCRIPTION OF THE DRAWINGS

FIG. 3 is a plan view of a central section of the support grid in a conventional fuel assembly.

DESCRIPTION OF THE PREFERRED EMBODIMENTS

Figure 1:
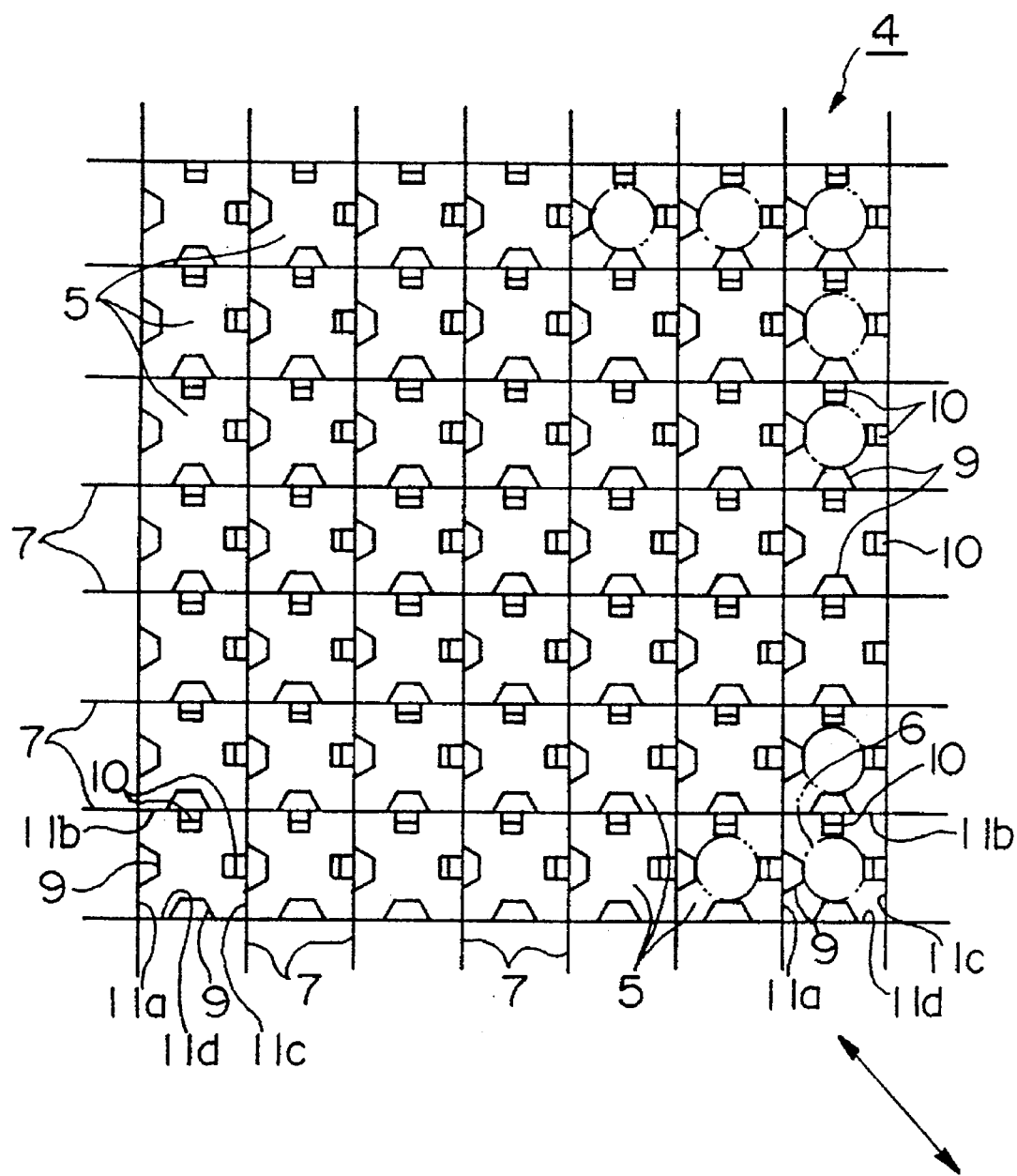
FIG. 1 is a schematic illustration of an embodiment of the fuel assembly of the present invention.
Figure 2:
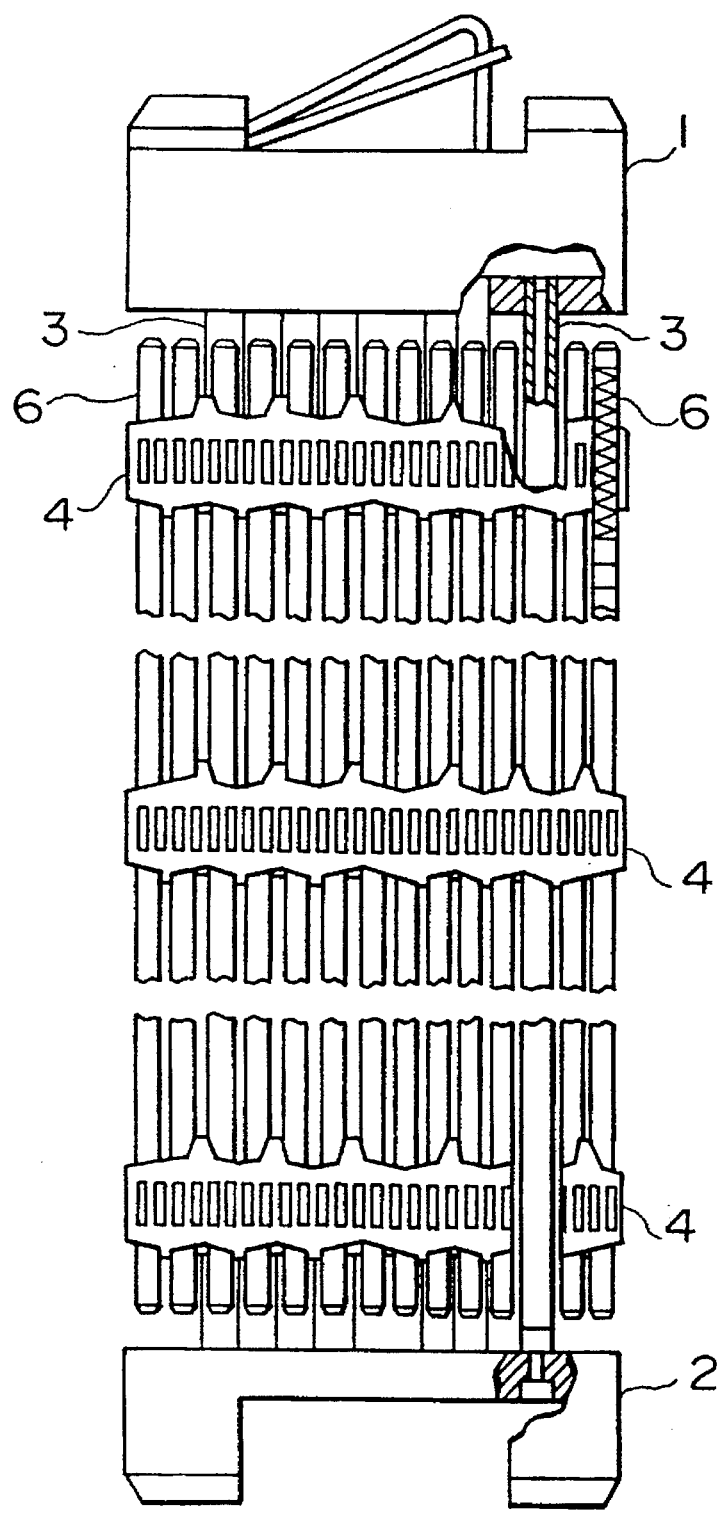
FIG. 2 is a schematic representation of a conventional fuel assembly.

A preferred embodiment of the fuel assembly will be explained with reference to FIG. 1.

In the following descriptions, those parts which are the same as in the conventional fuel assembly will be designated by the same reference numerals and their explanations will be omitted.

In this embodiment, the dimples 9 and the springs 10 are disposed as follows.

Assume that the direction of vibration of the support grid 4 in a plan view is in the arrow direction shown in this drawing, i.e. in the negative diagonal direction. A pair of adjacent walls 11a, 11d which are located on one side of the negative diagonal direction are respectively provided with dimples 9 while the other pair of adjacent walls 11b, 11c which are symmetrically located on the opposite side of the vibrational direction are respectively provided with springs 10. The fuel rods 6 in each of the grid cells 5 are therefore supported by pairs of supporting members each pair consisting of a dimple 9 and a spring 10 disposed in a transverse direction to the diagonal direction of vibration.

In the support grid 4 of such a configuration, the dimples 9 and the springs 10 are disposed symmetrically with respect to the transverse direction to the vibrational direction, which means that the fuel rods in vibration encounter supporting members having the same strength properties in forward and reverse cycles of vibration.

Therefore, even if vibrations are generated in the fuel assembly, it becomes more difficult for the fuel rods 6 to exhibit separation from the support members in the forward and reverse vibrational cycles. The fuel rods 6 hardly separate from the supporting members, i.e. the dimples 9 and springs 10, and abrasive wear on the fuel rods 6, produced by the fuel rods 6 bouncing between the dimples 9 and the springs 10, is prevented.

What is claimed is:

1. A fuel assembly having fuel rods, comprising:

a plurality of support grids having square shaped grid cells which have supporting members for supporting the fuel rods, said supporting members having a plurality of dimples and a plurality of springs provided on the four walls of each of the cells wherein each of said cells is formed by a plurality of straps intersecting at right angles to each other in each of said support grids, wherein in a plan view of each of said grids, said four walls are formed by a first pair of adjacent walls located on one side of a diagonal vibrational direction of said fuel assembly, and a second pair of adjacent walls located on an opposite side of said diagonal vibrational direction, and throughout each of said support grids, said dimples are respectively provided on said first pair of adjacent walls and said springs are provided respectively on said second pair of adjacent walls, and wherein said dimples and springs are disposed symmetrically with respect to a transverse direction to said diagonal vibrational direction and said dimples and springs respectively have the same strength properties in forward and reverse cycles of vibration.

2. A fuel assembly as claimed in claim 1, wherein in each of said grid cells, said dimples are a single pair of dimples and said springs are a single pair of springs.

* * * * *